United States Patent Office 2,765,312
Patented Oct. 2, 1956

2,765,312
QUATERNARY PIPERIDINIUM BOROHYDRIDES AND THEIR PREPARATION

Jack R. Gould, Morristown, N. J., assignor to Reaction Motors, Inc., Rockaway, N. J., a corporation of New Jersey No Drawing. Application March 26, 1953, Serial No. 344,725

18 Claims. (Cl. 260—293)

The present invention relates to quaternary piperidinium borohydrides, as a new class of compounds, and a process for the preparation thereof. These compounds are useful as powerful reducing agents, medicinals, rocket fuels, fuel additives, and for other applications.

It is an object of the present invention to provide a new class of compounds, quaternary piperidinium borohydrides, comprising N,N-disubstituted piperidinium borohydrides of the general formula

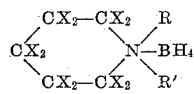

where R and R' are alkyl, aryl, alkaryl or aralkyl, and $CX_2$ is methylene or substituted methylene.

It is another object of the present invention to provide a new process for the preparation of quaternary piperidinium borohydrides, comprising N,N-disubstituted piperidinium borohydrides of the above general formula.

It is another object of the present invention to provide a new compound N-methyl-N-ethylpiperidinium borohydride.

It is another object of the present invention to provide a new compound N,N-diethylpiperidinium borohydride.

It is an object of the present invention to provide a new process for the preparation of the quaternary piperidinium borohydrides N-methyl-N-ethylpiperidinium borohydride and N,N-diethylpiperidinium borohydride by means of which process substantial yields are achieved.

Quaternary piperidinium borohydrides are prepared in the present invention by interaction of an N,N-disubstituted piperidinium halide with an alkali metal borohydride in aqueous or aqueous alcoholic medium at temperatures in the range from —30° C. to +50° C. The quaternary piperidinium borohydride is isolated from its resultant aqueous or aqueous alcoholic solution by addition of a suitable precipitating organic solvent comprising an amine, such as isopropylamine or n-butylamine or a mixture of both, or a mixture of such amines and an alcohol such as isopropyl alcohol as an example.

The reaction takes place according to the following equation:

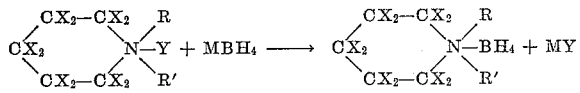

where R and R' represent alkyl, aryl, aralkyl or alkaryl, M represents an alkali metal such as lithium, sodium or potassium, $CX_2$ represents methylene or substituted methylene groups and Y represents a halogen atom.

It has been found by the present inventor that N,N-disubstituted piperidinium fluorides and sodium borohydride interacted in the presence of water are very effective in the preparation of quaternary piperidinium borohydrides.

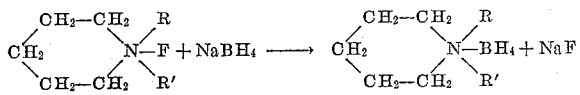

As an example of the preparation of a quaternary piperidinium borohydride in accordance with the method outlined above, N-methyl-N-ethylpiperidinium borohydride was prepared in accordance with the following detailed procedure.

A 30% aqueous solution of N-methyl-N-ethylpiperidinium fluoride was prepared by procedures known to the art. This, upon treatment with the stoichiometric amount of sodium borohydride at —10° C., yielded 94% of the theoretical amount of sodium fluoride as a fine, white precipitate. Filtration and dilution of the filtrate with cold isopropylamine gave N-methyl-N-ethylpiperidinium borohydride as white, hydroscopic crystals. The deliquescent behavior of this material in moist air approximates that of phosphorus pentoxide. Analysis for active (hydrolyzable) hydrogen was performed on a sample which had been dried at 110° C. under 2 to 3 mm. pressure, and a purity of approximately 85 percent was indicated (calculated for $C_8H_{22}NB$, 2.8% active hydrogen; found, 2.4%). Purification was accomplished by dissolving the crystals in a small amount of isopropanol, filtering the turbid solution and reprecipitating the compound from the clear filtrate by diluting with cold isopropylamine. The dried (110° C. under 1.5 mm. pressure for thirty minutes) crystals were analyzed for total carbon, hydrogen and nitrogen and for active (hydrolyzable) hydrogen by conventional methods.

*Analysis.*—Weight percent for $C_8H_{22}NB$:

| Element | Theoretical | Experimental | |
|---|---|---|---|
| C | 67.15 | 64.08 | 63.96 |
| H | 15.50 | 14.90 | 14.71 |
| N | 9.79 | 10.24 | 10.24 |
| H [1] | 3.82 | 2.78 | 2.72 |

[1] Active hydrogen.

As a second example, N,N-diethylpiperidinium borohydride was prepared as follows:

A 35% solution of N,N-diethylpiperidinium fluoride weighing 53 g. was contacted with slightly less than the equivalent amount of sodium borohydride at 0° C. for less than one hour. The precipitated sodium fluoride was removed by filtration. Addition of 700 cc. of isopropylamine to the clear filtrate precipitated 11.5 g. of white, hygroscopic crystals of N,N-diethylpiperidinium borohydride. The yield was 67% based upon sodium borohydride consumed. The product, after drying for one hour at 110° C. under 1.5 mm. pressure, was quite pure on the basis of active hydrogen content (calculated for $C_9H_{24}NB$, active hydrogen, 2.57%; found, 2.48, 2.44%). Nevertheless it was purified further in the manner described in the preceding example by precipitation with isopropylamine from its filtered isopropanolic solution, and was then dried at 110° C. under 1 mm. pressure. Analysis for active hydrogen and total carbon, hydrogen and nitrogen gave the following results:

*Analysis.*—Weight percent for $C_9H_{24}NB$:

| Element | Theoretical | Experimental | |
|---|---|---|---|
| C | 68.80 | 65.70 | 65.68 |
| H | 15.40 | 15.01 | 14.81 |
| N | 8.92 | 8.11 | 7.93 |
| H [1] | 2.57 | 2.6 | 2.6 |

[1] Active hydrogen.

It is not intended that any invention disclosed in this specification should be restricted to the precise examples given herein, but that the scope thereof should be commensurate with the context of the following claims.

What is claimed is:

1. As a new chemical compound, N-methyl-N-ethyl-piperidinium borohydride.
2. As a new chemical compound, N,N-diethylpiperidinium borohydride.
3. As a new class of compounds, quaternary di-lower alkyl piperidinium borohydrides.
4. A method for the preparation of quaternary di-lower alkyl piperidinium borohydrides which comprises contacting a di-lower alkyl piperidinium fluoride with an alkali metal borohydride in an aqueous medium at a temperature within the range of substantially $-30°$ C. to $+50°$ C.
5. The invention set forth in claim 4 with the contact taking place in an aqueous alcoholic medium.
6. A method for the preparation of quaternary di-lower alkyl piperidinium borohydrides which comprises contacting a di-lower alkyl piperidinium fluoride with sodium borohydride in an aqueous medium at a temperature within the range of substantially $-30°$ C. to $+50°$ C.
7. The invention set forth in claim 6 with the contact taking place in an aqueous alcoholic medium.
8. A method for the preparation of N-mehtyl-N-ethyl-piperidinium borohydride which comprises contacting N-methyl-N-ethylpiperidinium fluoride with sodium borohydride in an aqueous medium at a temperature within the range of substantially $-30°$ C. to $+50°$ C.
9. The invention set forth in claim 8 with the contact taking place in an aqueous alcoholic medium.
10. A method for the preparation of N-methyl-N-ethylpiperidinium borohydride which comprises contacting N-methyl-N-ethylpiperidinium fluoride with sodium borohydride in an aqueous medium at a temperature within the range of substantially $-30°$ C. to $+50°$ C. and then isolating the compound from solution by diluting with a liquid solvent selected from the groups comprising isopropylamine, butylamine, isopropylalcohol, mixtures of these three, alkyl amines and alcohols above ethyl.
11. A method for the preparation of N-methyl-N-ethylpiperidinium borohydride which comprises contacting N-methyl-N-ethylpiperidinium fluoride with sodium borohydride in an aqueous medium at a temperature within the range of substantially $-30°$ C. to $+50°$ C. and then isolating the compound from solution by adding an alkyl amine.
12. A method for the preparation of N,N-diethylpiperidinium borohydride which comprises contacting N,N-diethylpiperidinium fluoride with sodium borohydride in an aqueous medium at a temperature within the range of substantially $-30°$ C. to $+50°$ C.
13. The invention set forth in claim 12 with the contacting taking place in an aqueous alcoholic medium.
14. A method for the preparation of N,N-diethylpiperidinium borohydride which comprises contacting N,N-diethylpiperidinium fluoride with sodium borohydride in an aqueous medium at a temperature within the range of substantially $-30°$ C. to $+50°$ C. and then isolating the compound from solution by diluting with a liquid solvent selected from the groups comprising isopropylamine, butylamine, isopropylalcohol, mixtures of these, alkyl amines and alcohols above ethyl.
15. A method for the preparation of N,N-diethylpiperidinium borohydride which comprises contacting N,N-diethylpiperidinium fluoride with sodium borohydride in an aqueous medium at a temperature within the range of substantially $-30°$ C. to $+50°$ C. and then isolating the compound from solution by diluting with a liquid consisting of an alkyl amine.
16. A method for the preparation of quaternary di-lower alkyl piperidinium borohydrides which comprises contacting a di-lower alkyl piperidinium fluoride with sodium borohydride in an aqueous medium at a temperature within the range of substantially $-30°$ C. to $+50°$ C. and then isolating the compound from solution by diluting with isopropylamine.
17. A method for the preparation of quaternary di-lower alkyl piperidinium borohydrides which comprises contacting a di-lower alkyl piperidinium fluoride with sodium borohydride in an aqueous medium at a temperature within the range of substantially $-30°$ C. to $+50°$ C. and then isolating the compound from solution by diluting with n-butylamine.
18. A method for the preparation of quaternary di-lower alkyl piperidinium borohydrides which comprises contacting a di-lower alkyl piperidinium fluoride with sodium borohydride in an aqueous medium at a temperature within the range of substantially $-30°$ C. to $+50°$ C. and then isolating the compound from solution by diluting with a mixture of n-butylamine and isopropylamine.

References Cited in the file of this patent

Simons: Ind. and Eng. Chem., vol. 39, p. 238 (1947).